United States Patent
Beekhuis

(10) Patent No.: US 7,966,100 B2
(45) Date of Patent: Jun. 21, 2011

(54) PERFORMANCE METRICS IN RENEWALS ENERGY SYSTEMS

(75) Inventor: Christiaan Willem Beekhuis, San Jose, CA (US)

(73) Assignee: Power-One Renewable Energy Solutions, LLC, Camarillo, CA (US)

( * ) Notice: Subject to any disclaimer, the term of this patent is extended or adjusted under 35 U.S.C. 154(b) by 827 days.

(21) Appl. No.: 11/919,043

(22) PCT Filed: Apr. 28, 2006

(86) PCT No.: PCT/US2006/016450
§ 371 (c)(1),
(2), (4) Date: Oct. 22, 2007

(87) PCT Pub. No.: WO2006/119112
PCT Pub. Date: Nov. 9, 2006

(65) Prior Publication Data
US 2009/0313056 A1    Dec. 17, 2009

Related U.S. Application Data

(60) Provisional application No. 60/676,390, filed on Apr. 29, 2005.

(51) Int. Cl.
*G06F 19/00* (2006.01)
(52) U.S. Cl. ............................ 700/286; 713/2
(58) Field of Classification Search .................. 700/286, 700/291, 295, 297, 287; 707/999; 705/10, 705/8; 713/2; 714/2
See application file for complete search history.

(56) References Cited

U.S. PATENT DOCUMENTS

| | | |
|---|---|---|
| 5,566,084 A | 10/1996 | Cmar |
| 5,930,773 A | 7/1999 | Crooks et al. |
| 6,169,979 B1 | 1/2001 | Johnson |
| 6,519,730 B1 | 2/2003 | Ando et al. |
| 6,978,931 B2 | 12/2005 | Brobeck |
| 2002/0019802 A1 | 2/2002 | Malme et al. |
| 2002/0087234 A1 | 7/2002 | Lof et al. |
| 2003/0115251 A1 | 6/2003 | Fredrickson et al. |
| 2003/0126060 A1 | 7/2003 | Lof et al. ................. 705/36 |
| 2004/0143428 A1 | 7/2004 | Rappaport et al. |
| 2004/0163011 A1 | 8/2004 | Shaw |
| 2004/0205403 A1 | 10/2004 | Markow et al. |
| 2004/0260981 A1 | 12/2004 | Kitamorn et al. |
| 2005/0071348 A1* | 3/2005 | Laicher et al. ................. 707/100 |
| 2005/0229039 A1 | 10/2005 | Anderson et al. |

OTHER PUBLICATIONS

FatSpaniel, pp. A-G, L, M and R; images retrieved on www.archive. org / "waybackmachine" www.fatspaniel.com.*

* cited by examiner

*Primary Examiner* — Kidest Bahta
(74) *Attorney, Agent, or Firm* — Waddey & Patterson; Mark J. Patterson; Gary L. Monte

(57) ABSTRACT

Systems and methods are provided for collecting (200), aggregating (201), and analyzing data (202, 203) associated with the installation and deployment of systems. Energy systems, specifically renewable energy generating systems, are used as examples. The aggregated data (201) serve as the basis for a variety of services that improve the system performance metrics (209), improve the installation metrics, lower the cost, and provide monitoring and service to improve performance. Finally, services are provided that facilitate the improvement of the performance metrics of various Supply Chain Entities in the supply chain as well as overall system performance metrics.

20 Claims, 4 Drawing Sheets

PERFORMANCE METRICS IN RENEWALS ENERGY SYSTEMS

FIELD OF THE INVENTION

In general, the present invention relates to computer implemented systems and methods for providing services to a network of customers, more specifically to services enabled by methods comprising the collection, aggregation, and analysis of data in a central database from a plurality of systems that are not otherwise associated with one another to provide performance metrics and most particularly to the establishment and improvement of various performance metrics related to the execution of customer activities and the initiation of specific actions related to performance in comparison with such metrics. More specifically, the present invention relates to computer implemented services enabled by systems and methods comprising the collection, aggregation, and analysis of data related to the installation and operation of renewable energy systems comprising solar energy, wind turbine energy, tidal energy, geothermal energy, and the like, or to distributed energy generation systems comprising waste-to-energy generation systems, fuel cells, microturbines, diesel generators, and the like.

BACKGROUND OF THE INVENTION

There is increased interest in the development and deployment of renewable energy systems comprising solar energy, wind turbine energy, tidal energy, geothermal energy, and the like, or to distributed energy generation systems comprising waste-to-energy generation systems, fuel cells, microturbines, diesel generators, and the like. This interest is being driven by a number of factors including a limited supply of fossil fuels, increased pollution from the acquisition and use of fossil fuels, global warming considerations, rising costs of fossil fuels, the loss of natural lands due to the construction of fossil fuel power plants, continued utility grid degradation and blackouts, unpredictable energy prices, the need for local power generation in disaster recovery situations, the need to move away from centralized power plants to distributed energy systems for homeland security, and the like. Advancements in the development of renewable energy and distributed energy generation technologies have overcome earlier impediments such as poor efficiency, installation difficulty, high cost, high maintenance, and the like and are presently offering increasingly attractive alternatives to fossil fuel power systems in the generation and delivery of electric power.

One of the issues faced by the renewable energy and distributed energy generation industries is that the adoption and deployment of such systems is often sporadic and not well coordinated. The decision to invest in and install a renewable energy or distributed energy generation system is typically made at the individual entity level rather than as a planned activity for an entire community. For economy of language, in this context, an "entity" may comprise an individual, a company, an office building, a shopping mall, a shopping center, a sports complex, or other such organization, business, or group investing collectively in a source of energy. Consequently, the renewable energy and distributed energy generation industries often lack the coordinated, integrated infrastructure that is typically common in other industries. The lack of infrastructure inhibits the adoption and installation of new renewable energy and distributed energy generation systems and does not allow these industries to gain advantages due to cooperation or economies of scale to lower costs, increase acceptance and deployment, and attract additional investment capital.

Accordingly, there is a need for further developments in methods and systems to facilitate the connection and cooperation of the wide variety of entities and individual implementations of renewable energy or distributed energy generation systems to improve efficiencies, lower costs, facilitate new services, facilitate management and improvement of the energy production and distribution system as a whole, facilitate and improve training and education, facilitate energy commerce, and the like. In particular, there is a need for improved systems and methods to measure the performance of such energy generation and delivery systems ("performance metrics") and to improve such performance metrics as more data are collected and more experience is gained in the design, installation, operation, maintenance, repair, replacement and use of such systems.

BRIEF SUMMARY OF THE INVENTION

Advancements in the development of renewable energy and distributed energy generation systems have overcome, to a large extent, earlier impediments such as poor efficiency, installation difficulty, high cost, high maintenance, and the like. Specifically, advancements in the technology associated with the capture and conversion of solar energy into useable electricity has led to an increased adoption and deployment rate of solar energy generation systems. However, the infrastructure associated with collecting and analyzing data associated with the distribution infrastructure, system performance, system response, system efficiency, costs, savings associated with the system, and the like has not grown at the same pace as the implementation of solar energy generation systems. Systems and methods for the collection, aggregation, and analyzing of this data and providing services based on the results of the analysis have been developed as part of some embodiments of the present invention.

In some embodiments of the present invention, the data collection systems and methods cited above may use a local communications device installed at the site of the renewable energy generation or distributed energy generation system to collect data on the system comprising system ID, location, performance, calibration, ambient conditions, efficiency, temperature, wind speed, wind direction, solar irradiance, energy generation, device status flags, and the like. Typical data collection systems comprise embedded sensors, external sensors, embedded computers, and the like. Typical local communications devices comprise modems, routers, switches, embedded computers, wireless transmitters, and the like. The data may be transmitted via a wireless or hard-wired network or other communication means to a secure, central database where the data is aggregated with data from other systems and analyzed to provide value added services to the members of the renewable energy or distributed energy generation supply chain. Examples of suitable networks comprise the Internet, a Local Area Network (LAN), a Wide Area Network (WAN), a wireless network, cellular networks (e.g., GSM, GPRS, etc.), combinations thereof, and the like. Various embodiments of the present invention include security features such that proprietary or business-sensitive data is not accessible among different business entities, thereby providing all entities access to aggregated information while compromising the security of none.

Various embodiments of the present invention relate generally to systems and methods that utilize the secure, centrally collected, aggregated, and analyzed data to provide a number of beneficial services. The services may be desirable and useful to many "Supply Chain Entities" within the renewable energy or distributed energy generation system supply chain. For economy of language, we use the term, Supply Chain Entity or Entities to refer to one or more of the "Installation Technician", the "Value Added Reseller (VAR)", the "System Integrator", the "Original Equipment Manufacturer (OEM)" component supplier, the "local energy utility", various local government agencies, the Project Financier or Investor, the Distributed Utility provider, among others. These labels have been used for convenience in the context of the present teaching. It will be clear to those skilled in the art that those entities or parties that provide similar functions and services within the supply chain may use a wide variety of names and labels. These labels do not limit the scope of the present invention in any way.

In some embodiments of the present invention, the aggregated data may be used to offer services to the VARs that improve the use and performance of the various Installation Technicians in their employment. Data across the network may be used to establish benchmark metrics for Installation Technician performance. Typically, data from new installations are collected, analyzed, and compared to the benchmark metrics. The services may typically highlight Installation Technicians that are deserving of additional recognition because their performance metrics exceed the benchmark metrics. The services may also typically highlight Installation Technicians that would benefit from additional training because their performance metrics fall below the benchmark metrics. Typically, new data may be aggregated into the database and the benchmark metrics for Installation Technician performance may continue to rise over time. Typically, the VARs may enjoy the benefits of shorter installation times, lower installation costs, increased efficiency in the use and deployment of Installation Technician resources, increased End User satisfaction, and the like.

In some embodiments of the present invention, the aggregated data may be used to offer services to the System Integrators that improve the use and performance of the various VARs in their various distribution channels. Data across the network may be used to establish benchmark metrics for VAR performance. Typically, data from new installations are collected, analyzed, and compared to the benchmark metrics. The services may typically highlight VARs that are deserving of additional recognition because their performance metrics exceed the benchmark metrics. The services may also typically highlight VARs that would benefit from additional training because their performance metrics fall below the benchmark metrics. Typically, new data may be aggregated into the database and the benchmark metrics for VAR performance may continue to rise over time. Typically, the System Integrators may enjoy the benefits of shorter installation time, lower installation costs, increased efficiency in the use and deployment of Installation Technician resources, increased End User satisfaction, and the like.

In some embodiments of the present invention, the aggregated data may be used to offer services to the System Integrators and VARs that improve the use and performance of the various OEM components used their installed systems. Data across the network may be used to establish benchmark metrics for OEM component performance. Typically, data from new installations are collected, analyzed, and compared to the benchmark metrics. The services may typically highlight OEM components that are deserving of additional attention and selection because their performance metrics exceed the benchmark metrics. The services may also typically highlight OEM components that would benefit from additional development or exclusion from future designs because their performance metrics fall below the benchmark metrics. Typically, new data may be aggregated into the database and the benchmark metrics for OEM component performance may continue to rise over time. Typically, the System Integrators and VARs may enjoy the benefits of shorter installation time, lower installation costs, increased efficiency in the use and deployment of installation resources, increased End User satisfaction, increased reliability, and the like.

In some embodiments of the present invention, the aggregated data is used to offer services to the System Integrators and VARs that improve the performance of their installed systems. Data across the network may be used to establish benchmark metrics for system performance. Typically, data from systems are collected, analyzed, and compared to the benchmark metrics. The services may typically highlight systems that are deserving of additional attention and scrutiny because their performance metrics exceed the benchmark metrics. The services may also typically highlight systems that would benefit from a service call or troubleshooting activity because their performance metrics fall below the benchmark metrics. Typically, new data may be aggregated into the database and the benchmark metrics for system performance may continue to rise over time. The System Integrators and VARs may enjoy the benefits of improved system performance, improved system efficiency, shorter reaction/service time, lower costs, increased efficiency in the use and deployment of resources, increased End User satisfaction, increased reliability, and the like.

The methods of some embodiments of the present invention may be implemented on a plurality of systems. The systems may comprise one or more energy systems, sensors contained within the energy systems to monitor various settings and performance attributes of the energy system, sensors associated with the energy systems to measure various environmental conditions, a communications device for managing two-way communications between the sensors, the energy systems, and a network, a network for transmitting the data to a centralized database, a centralized database for receiving and storing data from a plurality of systems, user interfaces for interacting with the centralized database, procedures for acting upon the data, and a plurality of output means for displaying the results of the procedure treatments.

BRIEF DESCRIPTION OF THE DRAWINGS

Other aspects, embodiments and advantages of the invention may become apparent upon reading of the detailed description of the invention and the appended claims provided below, and upon reference to the drawings in which:

DETAILED DESCRIPTION OF THE INVENTION

In general, various embodiments of the present invention relate to systems and methods that utilize secure, centrally collected, aggregated, and analyzed data to provide a number of beneficial services. The services may be desirable and useful to many Supply Chain Entities within the renewable energy or distributed energy generation system supply chain.

Figure 1:
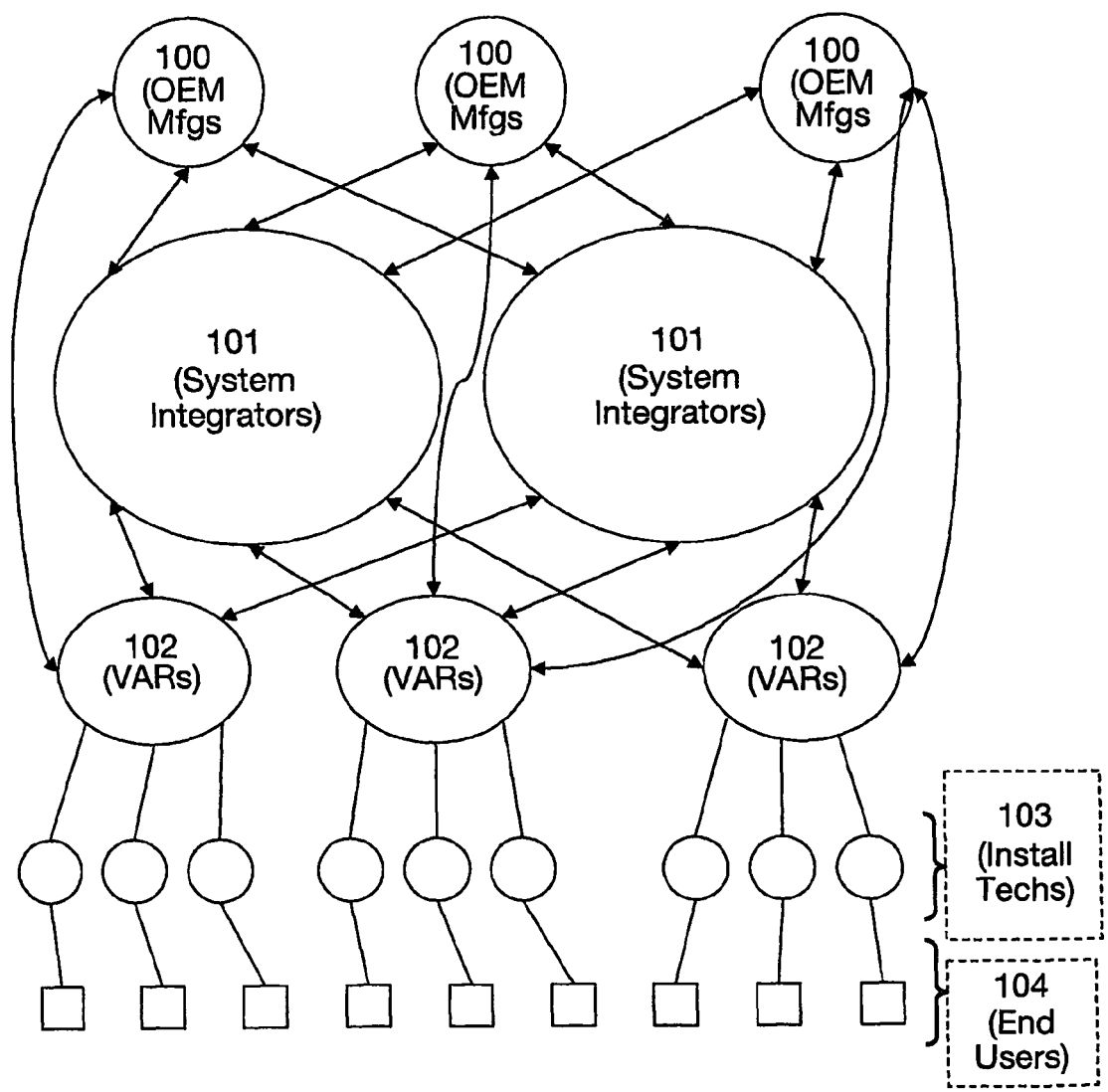
FIG. 1 is a schematic representation of a portion of a typical renewable energy or distributed energy generation system supply chain.

In some embodiments of the present invention, the systems and methods provide services to the various Supply Chain Entities in the renewable energy or distributed energy generation system supply chain. As an illustration, consider the supply chain structure illustrated in FIG. 1 wherein, large national Systems Integrators, 101, market and sell the renewable energy or distributed energy generation systems to End Users, 104. Typically, the System Integrators may design and oversee the installation and commissioning of the renewable energy or distributed energy generation systems. The System Integrators may contract with VARs, 102, who are local to the End Users and who may perform services comprising installation, service, upgrades, retrofits, and the like on behalf of the System Integrators. Furthermore, the VARs may employ a plurality of Installation Technicians, 103, who may perform services comprising installation, service, upgrades, retrofits, and the like on behalf of the VARs. OEM component suppliers, 100, may supply components to the System Integrators, 101, or the VARs, 102. These labels have been used for convenience in the context of the present teaching. It will be clear to those skilled in the art that those entities or parties that provide similar functions and services within the supply chain may use a wide variety of names and labels. These labels do not limit the scope of the present invention in any way.

In an exemplary embodiment of the present invention, the systems and methods may be applied to a solar energy generation system. However, the solar energy example does not limit the scope of the present invention in any way. The systems and methods described herein may be applied to any general system. Specifically, the systems and methods described herein may be applied to any general energy system such as an energy consumption system, an energy generation system, an energy storage system, combinations thereof, and the like. More specifically, the systems and methods described herein may be applied to any renewable energy generation comprising solar energy, wind turbine energy, tidal energy, geothermal energy, and the like, or distributed energy generation technology comprising waste-to-energy generation technologies, fuel cells, microturbines, diesel generators, and the like or any combination thereof. In the context of the present teaching, a system comprising more than one type of system as listed above will be designated a "hybrid" system.

Typically, the solar energy system may be installed by an Installation Technician following an established installation checklist. The system may be connected to a central database via a network. Examples of suitable networks comprise the Internet, a Local Area Network (LAN), a Wide Area Network (WAN), a wireless network, cellular networks (e.g., GSM, GPRS, etc.), combinations thereof, and the like. In this exemplary embodiment, System Identification Data are collected at the point of sale by the System Integrator or the VAR, said System Identification Data comprising, End User identification, system warranty information, system performance guarantee commitment information, expected system power output, and the like. The System Identification Data are static in time meaning that they may not generally change once established. The System Identification Data may be entered into the central database and serve as a unique identifier for the system. System Configuration Data are collected during the manufacture and testing of the system, said System Configuration Data comprising, system configuration with OEM component identification, system wiring details, system tracking features, system tracking capabilities, and the like. The System Configuration Data are generally static in time meaning that they may not generally change once established. However, the System Configuration Data may change during periods of service, upgrades, or enhancements to the system. The System Configuration Data may be entered into the central database and associated with the unique System Identification Data previously entered. System Installation Data are collected at the time of installation, said System Installation Data comprising, VAR identity, Installation Technician identity, installation location and region, system orientation, system tilt angle, expected shading, time to complete the system installation, number of errors during the system installation, an End User satisfaction index (EUSI), firmware revision, system parameter settings, and the like. In the context of the present teaching, "expected shading" may be associated with the area and time that the system is covered by shadows due to neighboring trees, building, structures, etc. It may be expressed in units of % coverage per hour for each time period of interest comprising months, seasons, years, billing periods, and the like. This quantity may be useful in estimating the performance of the system. The System Installation Data are static in time meaning that they may not generally change once established. The System Installation Data may be entered into the central database and associated with the unique System Identification Data previously entered. System Performance Data and ambient condition data are collected continuously at a predefined intervals after start-up of the system, said System Performance Data comprising, system response, system performance, ambient temperature, solar irradiance, conversion efficiency, current tilt angle, shading, system energy output, current firmware revision, current system parameter settings, device fault and error codes, power, voltage, cumulative energy generated, and the like. The System Performance Data change with time and are entered into the central database as a time series with associated date and time stamps. The temporal System Performance Data are associated with the unique System Identification Data previously entered. The data correlated to the installation region may be aggregated to several levels of granularity, said levels comprising country, time zone, state or province, county, postal code, Global Positioning System (GPS) coordinates, and the like. Additionally, System History Data may be associated with each unique System Identification Data record. The System History Data captures changes in the System Configuration Data over time. Examples of System History Data comprise time-to-first-service-call, details of the service calls, steps taken to resolve the issues in the service calls, upgrades to the system configuration, new firmware revisions, new parameter settings, and the like. Entries in the System History Data typically contain date and time stamps so that changes may be tracked over the life of the system.

Through the services provided, the data may be manipulated and parsed by the various Supply Chain Entities subject to various security measures as discussed below. A plurality of standard procedures exists to aid in the manipulation of the data. Examples of suitable procedures comprise methods for calculating typical statistical values such as mean, median, average, standard deviation, maximum value, minimum value, variance, and the like. These procedures are listed as illustrations only and do not limit the scope of the present invention in any way. Alternatively, the Supply Chain Entities may develop and generate custom procedures to extract and manipulate the data for their specific purpose. Examples of custom procedures are discussed below.

The systems and methods may include a number of security measures to protect the intellectual property and confidential information for the various Supply Chain Entities of the renewable energy system supply chain. The security measures may comprise software passwords, tokens, smart cards, biometric identification means, and the like. The security measures ensure that any specific System Integrator, VAR, or OEM manufacturer is only allowed access to the detailed data generated by systems under their specific responsibility. However, the System Integrators, VARs, or OEM manufacturers may request results based on the analysis of the aggregated data across the database so that they may compare their data to the larger population of systems.

Figure 3:
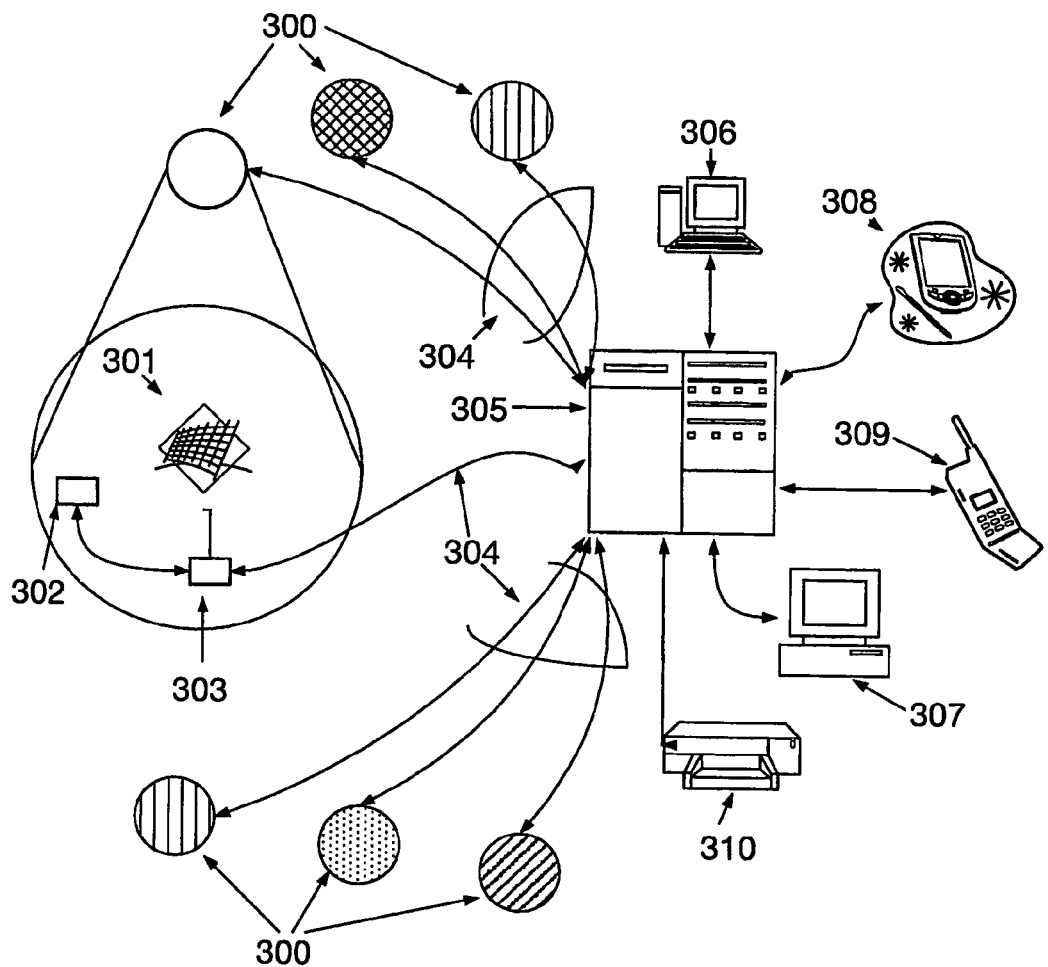
FIG. 3 is a schematic representation of a system pertaining to some embodiments of the present invention.

The database may contain data from systems installed worldwide by a large number of Supply Chain Entities. The different pattern fill of the circles representing systems, 300, illustrated in FIG. 3 is meant to convey that these systems are associated with different Supply Chain Entities. Comparisons and analyses may be completed by aggregating data from systems with similar features comprising one or more of System Integrator ID, VAR ID, Installation Technician ID, expected system power output, system configuration with OEM component identification, system wiring details, system tracking features, system tracking capabilities, installation region, system orientation, system tilt angle, firmware revision, system parameter settings, system response, system performance, ambient temperature, solar irradiance, conversion efficiency, current tilt angle, shading, system energy output, device fault and error codes, power, voltage, cumulative energy generated, and the like. Advantageously, the database enables the Supply Chain Entities to compare detailed data across systems under their responsibility or to compare their data to benchmark or aggregated data across the entire database. For example, a System Integrator may compare detailed data for his systems installed across a large region such as North America. Alternatively, the same System Integrator may compare data for one or more of his systems with benchmark or aggregated data for systems installed in a completely different region such as Europe.

The aggregated data may be used to offer services to the VARs that improve the deployment and performance of the various Installation Technicians. An exemplary list of data categories is shown in Table 1 for a solar energy system. Similar steps and tables may be envisioned for other renewable energy systems comprising wind turbine systems, tidal energy systems, geothermal energy systems, and the like, or distributed energy systems comprising waste-to-energy systems, fuel cells, microturbines, diesel generators, and the like. Tables 2-6 list similar exemplary data categories for some other energy systems respectively. Tables 1-6 are for illustrative purposes only and are not meant to limit the present invention to the specific data or systems listed. Those skilled in the art will be able to apply the teachings of the present invention to appropriate data categories and systems not specifically listed herein.

TABLE 1

Illustrative data categories for an exemplary solar energy system

| Data Type | System ID | System Config. | System Install | System Performance | History Data |
|---|---|---|---|---|---|
| Time Scale Data Types | Static System Integrator ID | Static System Config. | Static VAR ID | Temporal System Response | On Changes Time to $1^{st}$ Service Call |
| | End User ID | OEM Components | Installation Technician ID | System Performance | Service Calls |
| | Warranty | System Wiring | Install Region | Ambient Temperature | Resolution |
| | Performance Guarantee | Tracking Features | System Orientation | Solar Irradiance | Upgrades |
| | Planned System Power Output | Tracking Capability | System Tilt Angle | Conversion Efficiency | New Firmware Revision |
| | Location | Shading Information | Install Time | Current Tilt Angle | New Parameter Settings |
| | Region | | # of Errors | Energy Output | Component Replacements |
| | Utility | | End User Satisfaction Index | Current Firmware Revision | Maintenance Activities |
| | Utility Tariff Information | | Firmware Revision | Current Parameter Settings | End User Satisfaction Index |
| | Regional Energy Mix | | System Parameter Settings | | |

TABLE 2

Illustrative data categories for an exemplary wind turbine energy system

| Data Type | System ID | System Config. | System Install | System Performance | History Data |
|---|---|---|---|---|---|
| Time Scale Data Types | Static System Integrator ID | Static System Config. | Static VAR ID | Temporal System Response | On Changes Time to $1^{st}$ Service Call |
| | End User ID | OEM Components | Installation Technician ID | System Performance | Service Calls |
| | Warranty | System Wiring | Install Region | Ambient Temperature | Resolution |
| | Performance Guarantee | Fixed or Variable Direction | System Orientation | Barometric Pressure | Upgrades |
| | Planned System Power Output | Turbine blade size | Blade Tilt Angle | Wind Direction | New Firmware Revision |
| | Location | | Install Time | Wind Speed/Blade RPMs | New Parameter Settings |
| | Region | | # of Errors | Conversion Efficiency | Avian and/or Bat impacts |
| | Utility | | End User Satisfaction Index | Blade Tilt Angle | |
| | Utility Tariff Information | | Firmware Revision | Energy Output | |
| | Regional Energy Mix | | System Parameter Settings | Current Firmware Revision Current Parameter Settings Noise Measurements | |

TABLE 3

Illustrative data categories for an exemplary tidal energy system

| Data Type | System ID | System Config. | System Install | System Performance | History Data |
|---|---|---|---|---|---|
| Time Scale Data Types | Static System Integrator ID | Static System Config. | Static VAR ID | Temporal System Response | On Changes Time to $1^{st}$ Service Call |
| | End User ID | OEM Components | Installation Technician ID | System Performance | Service Calls |
| | Warranty | System Wiring | Install Region | Water Temperature | Resolution |
| | Performance Guarantee | | System Orientation | Wave Height | Upgrades |
| | Planned System Power Output | | Water depth | Conversion Efficiency | New Firmware Revision |
| | Location | | Install Time | Energy Output | New Parameter Settings |
| | Region | | # of Errors | Current Firmware Revision | |
| | Utility | | End User Satisfaction Index | Current Parameter Settings | |

TABLE 3-continued

Illustrative data categories for an exemplary tidal energy system

| Data Type | System ID | System Config. | System Install | System Performance | History Data |
|---|---|---|---|---|---|
| | Utility Tariff Information | | Firmware Revision | Water Flow Rate | |
| | Regional Energy Mix | | System Parameter Settings | Pressure Drop | |

TABLE 4

Illustrative data categories for an exemplary geothermal energy system

| Data Type | System ID | System Config. | System Install | System Performance | History Data |
|---|---|---|---|---|---|
| Time Scale Data Types | Static System Integrator ID | Static System Config. | Static VAR ID | Temporal System Response | On Changes Time to $1^{st}$ Service Call |
| | End User ID | OEM Components | Installation Technician ID | System Performance | Service Calls |
| | Warranty | System Wiring | Install Region | Working Temperature | Resolution |
| | Performance Guarantee | | System Depth | Conversion Efficiency | Upgrades |
| | Planned System Power Output | | Install Time | Energy Output | New Firmware Revision |
| | Location | | # of Errors | Current Firmware Revision | New Parameter Settings |
| | Region | | End User Satisfaction Index | Current Parameter Settings | |
| | Utility | | Firmware Revision | | |
| | Utility Tariff Information | | System Parameter Settings | | |
| | Regional Energy Mix | | | | |

TABLE 5

Illustrative data categories for an exemplary waste-to-energy system

| Data Type | System ID | System Config. | System Install | System Performance | History Data |
|---|---|---|---|---|---|
| Time Scale Data Types | Static System Integrator ID | Static System Config. | Static VAR ID | Temporal System Response | On Changes Time to $1^{st}$ Service Call |
| | End User ID | OEM Components | Installation Technician ID | System Performance | Service Calls |
| | Warranty | System Wiring | Install Region | Feedstock Volume | Resolution |
| | Performance Guarantee | | System Orientation | Conversion Efficiency | Upgrades |

TABLE 5-continued

Illustrative data categories for an exemplary waste-to-energy system

| Data Type | System ID | System Config. | System Install | System Performance | History Data |
|---|---|---|---|---|---|
| | Planned System Power Output | | Feedstock Composition | Energy Output | New Firmware Revision |
| | Location | | Install Time | Current Firmware Revision | New Parameter Settings |
| | Region | | # of Errors | Current Parameter Settings | |
| | Utility | | End User Satisfaction Index | | |
| | Utility Tariff Information | | Firmware Revision | | |
| | Regional Energy Mix | | System Parameter Settings | | |

TABLE 6

Illustrative data categories for an exemplary energy storage system

| Data Type | System ID | System Config. | System Install | System Performance | History Data |
|---|---|---|---|---|---|
| Time Scale Data Types | Static System Integrator End User ID | Static System Config. OEM Components | Static VAR ID Installation Technician ID | Temporal System Response System Performance | On Changes Time to 1$^{st}$ Service Call ID Service Calls |
| | Warranty | System Wiring | Install Region | Charge State | Resolution |
| | Performance Guarantee | Storage Type | System Orientation | Charge Capacity | Upgrades |
| | Planned System Power Output | Discharge Rate | Feedstock Composition | # of Charge/ Discharge Cycles | New Firmware Revision |
| | Location | Discharge Behavior vs Life Expectancy | Install Time | Total Energy Stored/ Released | New Parameter Settings |
| | Region | | # of Errors | Current Firmware Revision | Equalization Information |
| | Utility | | End User Satisfaction Index | Current Parameter Settings | |
| | Utility Tariff Information | | Firmware Revision | | |
| | | | System Parameter Settings | | |

Figure 2:
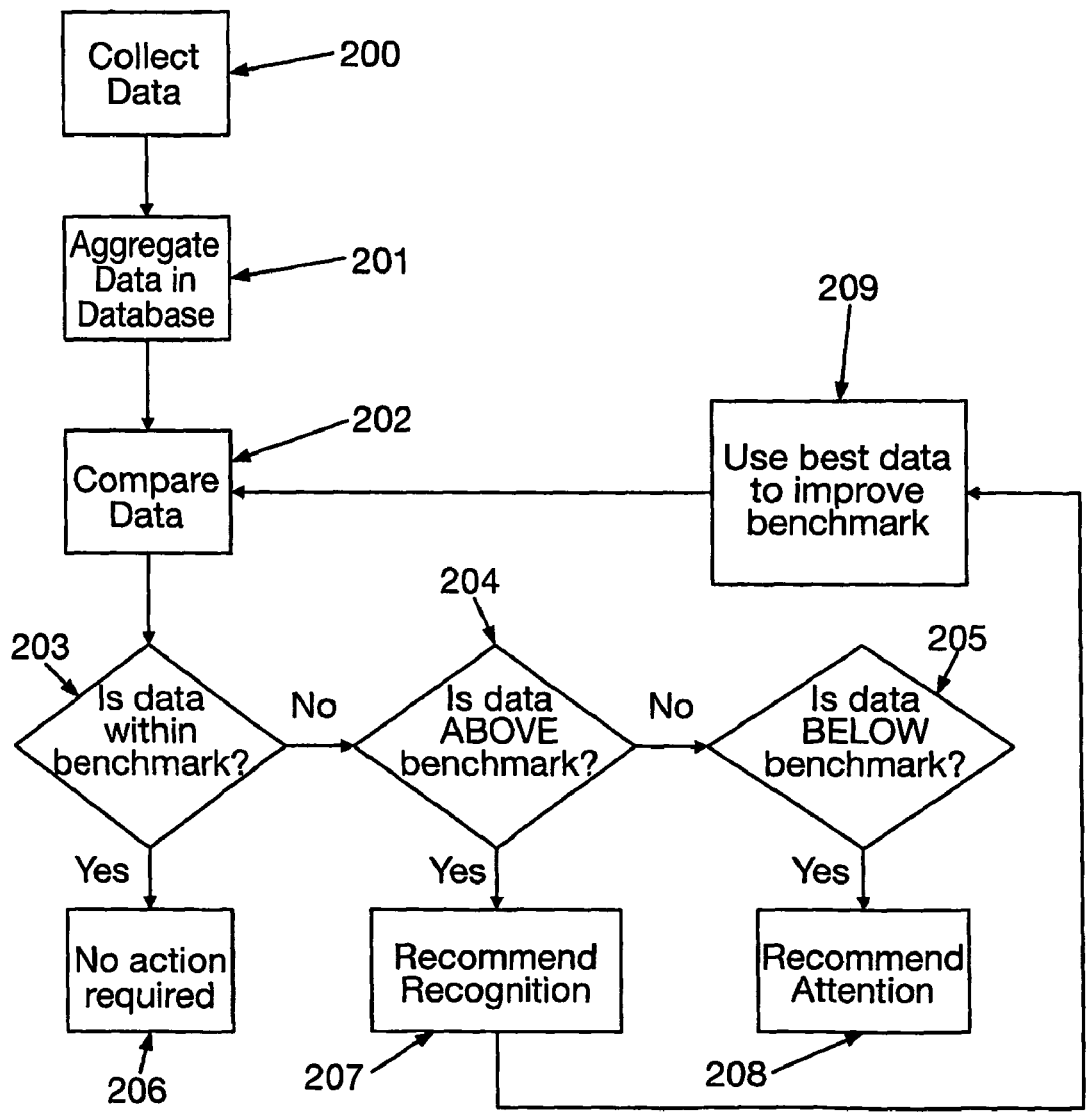
FIG. 2 is a flow chart of some embodiments of the generic benchmarking, collection, analyzing, comparison, and recommendation steps of the present invention.

The system and methods of some embodiments of the present invention provide tools and services to the Supply Chain Entities for accessing and analyzing the data in the central database. Referring now to FIG. 2, in some embodiments of the present invention, data from the database are used to establish benchmark metrics for Installation Technician performance. The Installation Technician performance benchmark metrics can be established from aggregated data based on parameters selected by the VARs. The VARs will only have access to the detailed data for systems that they are authorized to access, typically systems they have designed, commissioned, installed or serviced. The database security features mentioned previously will prevent the various Supply Chain Entities from accessing site-identifiable, proprietary, confidential, or competitive detailed data that are not associated with their systems. The VARs may organize or parse the data in meaningful categories. For example, the VARs may compare data based on factors such as expected system power output, system integrator identification, OEM component identification, installation region, system configuration, Installation Technician experience, and the like. The aggregated data may be used to establish a number of installation performance benchmark metrics. The VARs may select the population of data from the database that is of interest. For example, the VARs may choose to establish the benchmark metrics from data that is collected only from their region, or their direct involvement, or the like. Alternatively, the VARs may choose to establish the benchmark metrics from data that is collected from the entire database. Examples of said benchmark metrics include time required for system installation, installation cost or cost index, system performance, number of errors reported during system installation, time-to-first-service-call after system installation, service call history including complaint, time and cost, End User Satisfaction Index (EUSI), and the like. The VARs may select acceptable values that may form the benchmark metrics. The VARs may also be able to compare their benchmarks to similar global benchmarks that are established by analyzing the entire database, although they will not have access to the detailed data for systems outside their security clearance (that is, those they are authorized to access).

Referring again to FIG. 2, the systems and methods of some embodiments of the present invention may collect the data as previously described in step, 200, and aggregate the data into the central database in step, 201. The systems and methods of the present invention may then compare data from new installations to the benchmark metrics in step, 202. The methods of the present invention may follow the decision tree exemplified by steps, 203, 204, and 205. The methods may highlight Installation Technicians that are deserving of additional recognition because their performance metrics exceed the benchmark metric in step, 204. The VARs may use this data to drive a number of corporate improvement programs such as incentive programs, bonus programs, employee recognition programs and the like. Similarly, the methods may highlight Installation Technicians that are deserving of additional training or attention because their performance metrics fall below the benchmark metrics in step, 205. The VARs may use this data to drive a number of corporate improvement programs such as training programs, mentoring programs, employee improvement programs and the like. The services may provide data to the VARs for use in the training programs to highlight common errors, problems, mistakes, and proper corrective actions. Alternatively, common or repetitive errors may indicate poorly designed procedures rather than the need for employee improvements, and appropriate corrective actions can be implemented. Additionally, the new data may be used to improve the benchmark metrics over time as indicated in Step, 209.

The system and methods of some embodiments of the present invention provide tools and services to the Supply Chain Entities for accessing and analyzing the data in the central database. Referring now to FIG. 2, in some embodiments of the present invention, data across the database are used to establish benchmark metrics for VAR performance. The benchmark metrics may be established from aggregated data based on parameters selected by the System Integrators. The System Integrators will only have access to the detailed data for systems that they have designed, and commissioned. The database security features mentioned previously will prevent the various Supply Chain Entities from accessing proprietary, confidential, or competitive detailed data that are not associated with their systems. The System Integrators may parse the data in meaningful categories. For example, the System Integrators may compare data based on factors such as expected system power output, VAR identification, OEM component identification, installation region, system configuration, Installation Technician experience, and the like. The aggregated data may be used to establish a number of installation performance benchmark metrics. The System Integrators may select the population of data from the database that is of interest. For example, the System Integrators may choose to establish the benchmark metrics from data that is collected only from their region, or their direct involvement, or the like. Alternatively, the System Integrators may choose to establish the benchmark metrics from data that is collected from the entire database. Examples of said benchmark metrics comprising time required for system installation, installation cost or cost index, system performance, number of errors reported during system installation, time-to-first-service-call after system installation, service call history including complaint, time and cost, End User Satisfaction Index (EUSI), and the like. The System Integrators may select acceptable values that may form the benchmark metrics. The System Integrators may also be able to compare their benchmarks to similar global benchmarks that are established by analyzing the entire database, although they will not have access to the detailed data for systems outside their security clearance.

Referring again to FIG. 2, the systems and methods of some embodiments of the present invention may collect the data as previously described in step, 200, and aggregate the data into the central database in step, 201. The systems and methods of the present invention may then compare data from new installations to the benchmark metrics in step, 202. The systems and methods of the present invention may follow the decision tree formed by steps, 203, 204, and 205. The methods may highlight VARs that are deserving of additional recognition because their performance metrics exceed the benchmark metrics in step, 204. The System Integrators may use this data to drive a number of corporate improvement programs such as incentive programs, bonus programs, employee recognition programs and the like. Similarly, the methods may highlight VARs that are deserving of additional training or attention because their performance metrics fall below the benchmark metrics in step, 205. The System Integrators may use this data to drive a number of corporate improvement programs such as training programs, mentoring programs, employee improvement programs and the like. The services may provide data to the System Integrators for use in the training programs to highlight common errors, problems, mistakes, and proper corrective actions. Additionally, the new data may be used to improve the benchmark metrics over time as indicated in Step, 209.

The system and methods of some embodiments of the present invention provide tools and services to the Supply Chain Entities for accessing and analyzing the data in the central database. Referring now to FIG. 2, in some embodiments of the present invention, data across the database are used to establish benchmark metrics for OEM manufacturer component performance. The benchmark metrics may be established from aggregated data based on parameters selected by the System Integrators or VARS. The System Integrators or VARs will typically only have access to the detailed data for systems that they have designed, commissioned, installed, and serviced. The database security features mentioned previously will prevent the various Supply Chain Entities from accessing proprietary, confidential, or competitive information. The System Integrators or VARs may parse the data in meaningful categories. For example, the System Integrators or VARs may compare data based on factors such as expected system power output, OEM component identification, installation region, system configuration, Installation Technician experience, and the like. The aggregated data may be used to establish a number of installation performance benchmark metrics. The System Integrators or VARs may select the population of data from the database that is of interest. For example, the System Integrators or VARs may choose to establish the benchmark metrics from data that is collected only from their region, or their direct involvement, or the like. Alternatively, the System Integrators or VARs may choose to establish the benchmark metrics from data that is collected from the entire database. Examples of said benchmark metrics comprising time required for system installation, installation cost or cost index, system performance, number of errors reported during system installation, time-to-first-service-call after system installation, service call history including complaint, time and cost, End User Satisfaction Index (EUSI), and the like. The System Integrators or VARs may select acceptable values that may form the benchmark metrics. The System Integrators or VARs may also be able to compare their benchmarks to similar global benchmarks that are established by analyzing the entire database, although they will not have access to the detailed data for systems outside its security clearance.

Referring again to FIG. 2, the systems and methods of the present invention may collect the data as previously described in step, 200, and aggregate the data into the central database in step, 201. The systems and methods of the present invention may then compare data from new installations to the benchmark metrics in step, 202. The systems and methods of the present invention may follow the decision tree formed by steps, 203, 204, and 205. The systems and methods may highlight OEM manufacturer components that are deserving of additional attention and selection because their performance metrics exceed the benchmark metrics in step, 204. The System Integrators or VARs may use this data to drive a number of corporate improvement programs such as incentive programs, bonus programs, OEM manufacturer recognition programs and the like. Similarly, the systems and methods may highlight OEM manufacturer components that are deserving of additional development or exclusion from future designs because their performance metrics fall below the benchmark metrics in step, 205. The System Integrators or VARs may use this data to drive a number of corporate improvement programs such as training programs, mentoring programs, OEM manufacturer improvement programs and the like. The services may provide data to the System Integrators or VARs for use in the training programs to highlight common errors, problems, mistakes, and proper corrective actions. Additionally, the new data may be used to improve the benchmark metrics over time as indicated in Step, 209.

The system and methods of some embodiments of the present invention provide tools and services to the Supply Chain Entities for accessing and analyzing the data in the central database. Referring now to FIG. 2, in some embodiments of the present invention, data across the database are used to establish benchmark metrics for system performance. The benchmark metrics may be established from aggregated data based on parameters selected by the System Integrators, VARs, or OEM manufacturers. The System Integrators, VARs, or OEM manufacturers will typically only have access to the detailed data for systems that they have designed, commissioned, installed, or serviced. The database security features mentioned previously will prevent the various Supply Chain Entities from accessing proprietary, confidential, or competitive detailed data that are not associates with their systems. The System Integrators, VARs, or OEM manufacturers may parse the data in meaningful categories. For example, the System Integrators, VARs, or OEM manufacturers may compare data based on factors such as expected system power output, OEM component identification, installation region, system configuration, system compass settings, system azimuthal angle, and the like. The aggregated data may be used to establish a number of system performance benchmark metrics. The System Integrators, VARs, or OEM manufacturers may select the population of data from the database that is of interest. For example, the System Integrators, VARs, or OEM manufacturers may choose to establish the benchmark metrics from data that is collected only from their region, or their direct involvement, or the like. Alternatively, the System Integrators, VARs, or OEM manufacturers may choose to establish the benchmark metrics from data that is collected from the entire database. Examples of said benchmark metrics comprising energy generation, energy efficiency, cost or cost index, system performance, number of errors reported, time-to-first-service-call after system installation, service call history including complaint, time and cost, End User Satisfaction Index (EUSI), and the like. The System Integrators, VARs, or OEM manufacturers may select acceptable values that may form the benchmark metrics. The System Integrators, VARs, or OEM manufacturers may also be able to compare their benchmarks to similar global benchmarks that are established by analyzing the entire database, although they will not have access to the detailed data for systems outside their security clearance.

Referring again to FIG. 2, the systems and methods of some embodiments of the present invention may collect the data as previously described in step, 200, and aggregate the data into the central database in step, 201. The systems and methods of the present invention may then compare data from selected systems to the benchmark metrics in step, 202. The systems and methods of the present invention may follow the decision tree formed by steps, 203, 204, and 205. The systems and methods may highlight systems that are deserving of additional attention and selection because their performance metrics exceed the benchmark metrics in step, 204. The System Integrators, VARs, or OEM manufacturers may use this data to drive a number of corporate improvement programs such as incentive programs, bonus programs, recognition programs, component selection decisions, public relations, and the like. Similarly, the systems and methods may highlight systems that are deserving of a service call or troubleshooting activity because their performance metrics fall below the benchmark metric in step, 205. The System Integrators, VARs, or OEM manufacturers may use this data to drive a number of corporate improvement programs such as training programs, mentoring programs, employee improvement programs, component selection decisions, and the like. The services may provide data to the System Integrators, VARs, or OEM manufacturers for use in the training programs to highlight common errors, problems, mistakes, and proper corrective actions. Additionally, the new data may be used to improve the benchmark metrics over time as indicated in Step, 209.

Table 7 illustrates a subset of the data that might be contained in the central database. The first two rows illustrate the benchmark metrics for exemplary solar energy systems of various sizes, in this case, 20 kilowatt (kW) and 100 kW. These benchmark metrics may be established from the entire population of solar energy installations included in the database. This scope of data collection, aggregation, and analysis is not currently typical since the various Supply Chain Entities in the solar energy supply chain do not typically collect data or share any detailed data with each other. Table 7 contains exemplary data from various Supply Chain Entities comprising three System Integrators (A, B, C), three VARs (I, II, III), three Installation Technicians (1, 2, 3), and three OEM component manufacturers (X, Y, Z). Exemplary installation performance data are included that illustrates the Time, Cost, and Number of Errors for each installation to be used as metrics to evaluate performance metrics of the exemplary Supply Chain Entities.

Table 8 illustrates an exemplary result of one possible procedure used to analyze the data contained in Table 7. For illustrative purposes, if the performance metric exceeded the benchmark metric, it was given an arbitrary value of "+1", if the performance metric was equal to the benchmark metric it was given an arbitrary value of "0", and if the performance metric fell below the benchmark metric, it was given an arbitrary value of "−1". The data for each Supply Chain Entity was then established by calculating the arithmetic summation across those installations where that Supply Chain Entity was involved and the resulting metric entered into Table 8.

It is clear from the data in Tables 7 and 8 that Installation Technician "1" is highly skilled and may be deserving of additional recognition because the performance metric results are positive in each of the three categories. Likewise, Installation Technician "2" shows poor performance in both the areas of Cost and Errors and may need additional training or mentoring due to the negative performance metric results in these areas. Installation Technician "3" is not meeting the benchmark performance metrics for Time and may benefit from acquiring tips from his peers on more efficient installation techniques. This procedure for treatment of the data is for illustration purposes only. For example, other procedures comprising other analytical techniques may comprise calculating a weighted average based on several performance metrics, calculating a performance trend based on the last several installations, use of simple "pass/fail" criteria, and the like. It will be clear to those skilled in the art that there are many procedures comprising many analytical methods that can be used to analyze the original data. The use of these particular examples in no way limits the scope of the present invention.

It is clear from the data in Tables 7 and 8 that VAR "I" is highly skilled and may be deserving of additional recognition because the performance metric results are positive in each of the three categories. Likewise, VAR "II" shows poor performance in the area of Cost and may need additional training or mentoring due to the negative performance metric results in this area. VAR "III" is not meeting the benchmark for Time and may benefit from acquiring tips from his peers on more efficient installation techniques. This procedure for treatment of the data is for illustration purposes only. For example, other procedures comprising other analytical techniques may comprise calculating a weighted average based on several performance metrics, calculating a performance trend based on the last several installations, use of simple "pass/fail" criteria, and the like. It will be clear to those skilled in the art that there are many procedures comprising many analytical methods that can be used to analyze the original data. The use of these particular examples in no way limits the scope of the present invention.

It is clear from the data in Tables 7 and 8 that OEM manufacturer components "X" perform well and may be deserving of additional consideration and use on future projects because the performance metric results are positive in each of the three categories. Likewise, OEM manufacturer components "Y" show poor performance in both the areas of Cost and Errors and may need additional development or exclusion from future projects due to the negative performance metric results in these areas. OEM manufacturer components "Z" are not meeting the benchmark for Time and may benefit from development to enable more efficient installation techniques. This procedure for treatment of the data is for illustration purposes only. For example, other procedures comprising other analytical techniques may comprise calculating a weighted average based on several performance metrics, calculating a performance trend based on the last several installations, use of simple "pass/fail" criteria, and the like. It will be clear to those skilled in the art that there are many procedures comprising many analytical methods that can be used to analyze the original data. The use of these particular examples in no way limits the scope of the present invention.

TABLE 7

Illustrative installation data for a solar energy system

| System | Size | System Integrator | VAR | Install Tech | OEM Comp | Time | Cost | Errors |
|---|---|---|---|---|---|---|---|---|
| Benchmark 20 kW | 20 kW | | | | | 2 weeks | $5K | 4 |
| Benchmark 100 kW | 100 kW | | | | | 4 weeks | $20K | 6 |
| 1 | 20 kW | A | I | 1 | X | 1 week | $3K | 2 |
| 2 | 20 kW | B | I | 1 | X | 2 weeks | $5K | 3 |
| 3 | 100 kW | A | II | 2 | Y | 4 weeks | $20K | 5 |
| 4 | 20 kW | C | I | 1 | X | 1 week | $5K | 4 |
| 5 | 100 kW | B | II | 2 | Y | 3 weeks | $25K | 6 |
| 6 | 100 kW | C | II | 2 | Y | 6 weeks | $30K | 10 |
| 7 | 100 kW | A | III | 3 | Z | 5 weeks | $18K | 5 |
| 8 | 20 kW | B | III | 3 | Z | 3 weeks | $7K | 5 |
| 9 | 100 kW | C | III | 3 | Z | 4 weeks | $15K | 3 |
| 10 | 20 kW | A | II | 1 | Z | 1 week | $4K | 1 |

TABLE 8

Illustrative installation data analysis for a solar energy system

| Entity | Time | Cost | Errors |
|---|---|---|---|
| A | 1 | 3 | 4 |
| B | 0 | −2 | −1 |
| C | 0 | 0 | 0 |
| I | 2 | 1 | 2 |
| II | 1 | −1 | 0 |
| III | −2 | 1 | 1 |
| 1 | 3 | 2 | 3 |
| 2 | 0 | −2 | −1 |
| 3 | −2 | 1 | 1 |
| X | 2 | 1 | 2 |
| Y | 0 | −2 | −1 |
| Z | −1 | 2 | 2 |

Table 9 illustrates a subset of the data that may be contained in the central database. The first three rows illustrate the benchmark metrics for exemplary solar energy systems of various sizes, in this case, 20 kW, 50 kW, and 100 kW. These benchmark metrics may be established from the entire population of solar energy installations included in the database. This scope of data collection, aggregation, and analysis is not currently typical since the various Supply Chain Entities in the solar energy supply chain do not typically collect or share any detailed data with each other. Table 9 contains exemplary data from various systems installed in a similar region having similar compass and tilt angle settings. Sample System Performance Data are included that illustrate the energy generated and energy efficiency for each system to be established as metrics to compare the performance of the systems.

Table 10 illustrates an exemplary result of one possible analysis of the data contained in Table 9. For illustrative purposes, if the performance metric exceeded the benchmark metric, it was given an arbitrary value of "+1", if the performance metric was equal to the benchmark metric, it was given an arbitrary value of "0", and if the performance metric fell below the benchmark metric, it was given an arbitrary value of "−1".

It is clear from the data in Tables 9 and 10 that systems "3", "4", and "5" perform well and may be deserving of additional consideration and investigation because the performance metric results are positive in each of the categories. Likewise, systems "1", "2", "7", and "9" illustrate poor performance in both areas and may need a service call or troubleshooting activity due to the negative performance results in these areas. This procedure for treatment of the data is for illustration purposes only. For example, other procedures comprising other analytical techniques may comprise calculating a weighted average based on several performance metrics, calculating a performance trend based on the last several installations, use of simple "pass/fail" criteria, and the like. It will be clear to those skilled in the art that there are many procedures comprising many analytical methods that can be used to analyze the original data. The use of these particular examples in no way limits the scope of the present invention.

TABLE 9

Illustrative installation data for solar energy systems

| System | Size | Region | Compass Angle | Tilt Angle | Sun Exposure | Energy | Energy Efficiency |
|---|---|---|---|---|---|---|---|
| Benchmark 20 kW | 20 kW | CA | South | 45° | 10 hrs | 18 kW | 20.0% |
| Benchmark 50 kW | 50 kW | CA | South | 45° | 10 hrs | 45 kW | 20.0% |
| Benchmark 100 kW | 100 kW | CA | South | 45° | 10 hrs | 90 kW | 20.0% |
| 1 | 20 kW | CA | South | 45° | 10 hrs | 16 kW | 17.8% |
| 2 | 20 kW | CA | South | 40 | 10 hrs | 10 kW | 11.1% |
| 3 | 50 kW | CA | South | 45° | 10 hrs | 55 kW | 24.4% |
| 4 | 100 kW | CA | South | 35° | 10 hrs | 92 kW | 20.4% |
| 5 | 50 kW | CA | South | 40° | 10 hrs | 46 kW | 20.4% |
| 6 | 20 kW | CA | South | 45° | 10 hrs | 18 kW | 20.0% |
| 7 | 100 kW | CA | South | 35° | 10 hrs | 85 kW | 18.9% |
| 8 | 100 kW | CA | South | 40° | 10 hrs | 90 kW | 20.0% |
| 9 | 50 kW | CA | South | 45° | 10 hrs | 40 kW | 17.8% |

TABLE 10

Illustrative installation data analysis for solar energy systems

| System | Energy | Energy Efficiency |
|---|---|---|
| 1 | −1 | −1 |
| 2 | −1 | −1 |
| 3 | +1 | +1 |
| 4 | +1 | +1 |
| 5 | +1 | +1 |
| 6 | 0 | 0 |
| 7 | −1 | −1 |
| 8 | 0 | 0 |
| 9 | −1 | −1 |

The services and methods may compare new installation system performance metrics to the benchmark metrics and highlight systems whose performance metrics exceed the benchmark metric. Similarly, the services and methods may highlight systems whose performance metrics fall below the benchmark metric. This may highlight systems that may need attention and may also serve as input into the performance of the various Supply Chain Entities as mentioned previously.

Referring now to FIG. 3, the methods of some embodiments of the present invention may be implemented on a plurality of systems. The systems may comprise one or more energy systems, 300, sensors contained within the energy system to monitor various settings and performance attributes of the energy system, sensors associated with the energy system to measure various environmental conditions, 302, a local communications device for managing two-way communications between the sensors, the energy systems, and a network, 303, a network for transmitting the data to a centralized database, 304, a centralized database for receiving and storing data from the plurality of systems, 305, user interfaces for interacting with the centralized database, 306-309, procedures for acting upon the data, and a plurality of output devices for displaying the results of the procedure action, 306-310.

Continuing to refer to FIG. 3, in some exemplary embodiments comprising solar energy generation systems, the sensors contained within the system may monitor various settings and performance attributes comprising, system response, system performance, conversion efficiency, current tilt angle, shading, system energy output, current firmware revision, current system parameter settings, device fault and error codes, power, voltage, cumulative energy generated, and the like. Sensors associated with the system, 302, may measure various environmental conditions comprising ambient temperature, solar irradiance, and the like. The data may be communicated onto a network, 304, by a local communications device, 303. Examples of suitable networks comprise the Internet, a Local Area Network (LAN), a Wide Area Network (WAN), a wireless network, a satellite network, cellular networks (e.g., GSM, GPRS, etc.), combinations thereof, and the like. The data may be received and stored on a centralized database, 305. The data in the centralized database may be accessed by a plurality of user interfaces comprising computer terminals, 307, personal computers (PCs), 306, personal digital assistants (PDAs), 308, cellular phones, 309, interactive displays, and the like. This allows the user to be located remotely from the centralized database. As mentioned previously, the centralized database contains a variety of security features to prevent sensitive detailed data from being viewed or accessed by users without the proper security clearance. Procedures may be used to act on the data to generate results of various inquires. The procedures may be part of a standard set of calculations or may be developed and generated by the user. The results of the action by the procedures may be displayed to the user on a number of output means. Examples of suitable output means comprise computer terminals, 307, personal computers (PCs), 306, printers, 310, LED displays, personal digital assistants (PDAs), 308, cellular phones, 309, interactive displays, and the like.

Figure 4:
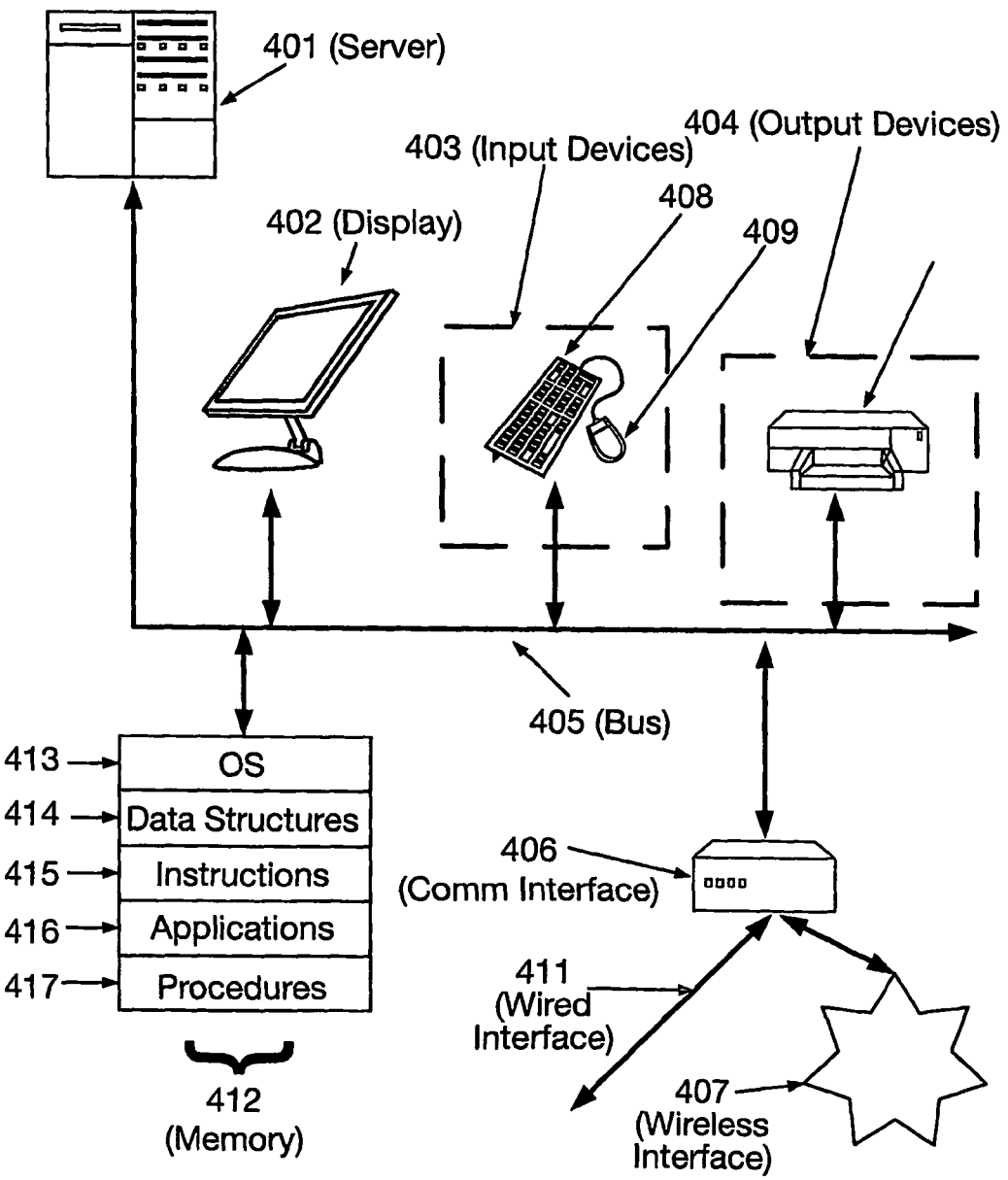
FIG. 4 depicts an illustrative computer system pertaining to various embodiments of the present invention.

FIG. 4 depicts an illustrative computer system pertaining to various embodiments of the present invention. In some embodiments, the computer system comprises a server 401, display, 402, one or more input interfaces, 403, communications interface, 406, and one or more output interfaces, 404, all conventionally coupled by one or more buses, 405. The server, 401, comprises one or more processors (not shown) and one or more memory modules, 412. The input interfaces, 403, may comprise a keyboard, 408, and a mouse, 409. The output interface, 404, may comprise a printer, 410. The communications interface, 406, is a network interface that allows the computer system to communicate via a wireless or hardwired network, 407, as previously described. The communications interface, 407, may be coupled to a transmission medium, 411, such as a network transmission line, for example, twisted pair, coaxial cable, fiber optic cable, and the like. In another embodiment, the communications interface, 411, provides a wireless interface, that is, the communication interface, 411 uses a wireless transmission medium. Examples of other devices that may be used to access the computer system via communications interface, 406, comprise cell phones, PDAs, personal computers, and the like (not shown).

The memory modules, 412, generally comprises different modalities, illustratively semiconductor memory, such as random access memory (RAM), and disk drives as well as others. In various embodiments, the memory modules, 412, store an operating system, 413, collected and aggregated data, 414, instructions, 415, applications, 416, and procedures, 417.

In various embodiments, the specific software instructions, data structures and data that implement various embodiments of the present invention are typically incorporated in the server, 401. Generally, an embodiment of the present invention is tangibly embodied in a computer readable medium, for example, the memory and is comprised of instructions, applications, and procedures which, when executed by the processor, causes the computer system to utilize the present invention, for example, the collection, aggregation, and analysis of data, establishing benchmark metrics for performance, comparing performance data to the benchmark metrics, displaying the results of the analyses, and the like. The memory may store the software instructions, data structures, and data for any of the operating system, the data collection application, the data aggregation application, the data analysis procedures, and the like in semiconductor memory, in disk memory, or a combination thereof.

The operating system may be implemented by any conventional operating system comprising Windows® (Registered trademark of Microsoft Corporation), Unix® (Registered trademark of the Open Group in the United States and other countries), Mac OS® (Registered trademark of Apple Computer, Inc.), Linux® (Registered trademark of Linus Torvalds), as well as others not explicitly listed herein.

In various embodiments, the present invention may be implemented as a method, system, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier or media. In addition, the software in which various embodiments are implemented may be accessible through the transmission medium, for example, from a server over the network. The article of manufacture in which the code is implemented also encompasses transmission media, such as the network transmission line and wireless transmission media. Thus the article of manufacture also comprises the medium in which the code is embedded. Those skilled in the art will recognize that many modifications may be made to this configuration without departing from the scope of the present invention.

The exemplary computer system illustrated in FIG. 4 is not intended to limit the present invention. Other alternative hardware environments may be used without departing from the scope of the present invention.

The foregoing descriptions of exemplary embodiments of the present invention have been presented for the purpose of illustration and description. They are not intended to be exhaustive or to limit the present invention to the precise forms disclosed, and obviously many modifications, embodiments, and variations are possible in light of the above teaching.

What is claimed is:

1. A computer implemented method for monitoring Supply Chain Entity performance metrics, comprising:

connecting an installed System to a central database via a network;
collecting original data comprising at least one of System Identification Data, System Configuration Data, System Installation Data, System Performance Data, or System History Data;
entering said original data into said central database;
establishing Supply Chain Entity performance metrics based on said original data;
aggregating said original data and data from one or more systems not associated with the installed System stored within said central database;
establishing original benchmark metrics for Supply Chain Entity performance metrics based on said aggregated data;
comparing said Supply Chain Entity performance metrics against said established benchmark metrics;
displaying Supply Chain Entities whose performance metrics exceed said benchmark metrics;
displaying Supply Chain Entities whose performance metrics fall below said benchmark metrics;
establishing adjusted benchmark metrics for Supply Chain Entity performance metrics by adding data from said Supply Chain Entity performance metrics that exceed said original benchmark metrics into said aggregated data; and
collecting original data, entering said original data, aggregating said original data and establishing original benchmark perform by a computer processor.

2. The method of claim 1 wherein said System comprises an energy system.

3. The method of claim 2 wherein said energy system comprises an energy usage system an energy storage system, an energy management system, or an energy generation system.

4. The method of claim 3 wherein said energy generation system comprises a renewable energy generation system.

5. The method of claim 4 wherein said renewable energy generation system comprises a solar energy generation system, a wind turbine energy generation system, a tidal energy generation system, a geothermal energy generation system, a waste-to-energy generation system, or combination thereof.

6. The method of claim 1 wherein said Supply Chain Entity comprises System Integrators, Value Added Resellers, Installation Technicians, or Original Equipment Manufacturers.

7. A computer implemented method for monitoring System Performance metrics, comprising:
connecting an installed System to a central database via a network;
collecting original data comprising at least one of System Identification Data, System Configuration Data, System Installation Data, System Performance Data, or System History Data;
entering said original data into said central database;
establishing System Performance metrics based on said original data;
aggregating said original data and data from one or more systems not associated with the installed System held within said central database;
establishing original benchmark metrics for System Performance metrics based on said aggregated data;
comparing said System Performance metrics against said established benchmark metrics;
displaying Systems whose System Performance metrics exceed said benchmark metric;
displaying Systems whose System Performance metrics fall below the benchmark metrics;
adjusting benchmark metrics for System Performance metrics by adding data from said System Performance metrics that exceed said original benchmark metrics into said aggregated data; and
collecting original data, entering said original data, aggregating said original data and establishing original benchmark perform by a computer processor.

8. The method of claim 7 wherein said System comprises an energy system.

9. The method of claim 8 wherein said energy system comprises an energy usage system an energy storage system, an energy management system, or an energy generation system.

10. The method of claim 9 wherein said energy generation system comprises a renewable energy generation system.

11. The method of claim 10 wherein said renewable energy generation system comprises a solar energy generation system, a wind turbine energy generation system, a tidal energy generation system, a geothermal energy generation system, a waste-to-energy generation system, or combinations thereof.

12. A system for monitoring Supply Chain Entity performance metrics, comprising:
one or more Energy Systems;
sensors coupled to said Energy Systems to monitor said Energy Systems settings and performance attributes data;
sensors associated with said Energy Systems to measure environmental conditions data;
a network;
a local communications device functionally coupled to said sensors and to said network and functional to communicate said Energy Systems settings and performance attributes data and said environmental conditions data onto said network;
said network functional to transmit said Energy Systems settings and performance attributes data and said environmental conditions data;
a centralized database functionally coupled to receive and store said Energy Systems settings and performance attributes data and said environmental conditions data;
a user interface coupled to interact with said centralized database;
a computer readable medium containing procedures for acting upon said Energy Systems settings and performance attributes data and said environmental conditions data, said procedures comprising
aggregating the received and stored data with data from one or more systems not associated with said Energy System,
establishing benchmark metrics Supply Chain Entity performance based on the aggregated data,
establishing Supply Chain Entity performance metrics, and
comparing said Supply Chain Entity performance metrics to said benchmark metrics; and
at least one output devices functional to display results of said procedure action upon said Energy Systems settings and performance attributes data and said environmental conditions data.

13. The system of claim 12 wherein said one or more Energy Systems comprise at least one of an energy usage system, an energy storage system, an energy management system, and an energy generation system.

14. The system of claim 13 wherein said energy generation system comprises a renewable energy generation system.

15. The system of claim 14 wherein said renewable energy generation system comprises a solar energy generation system, a wind turbine energy generation system, a tidal energy generation system, a geothermal energy generation system, a waste-to-energy generation system, or combinations thereof.

16. The system of claim 12 wherein said Supply Chain Entity comprises System Integrators, Value Added Resellers, Installation Technicians, or Original Equipment Manufacturers.

17. A system for monitoring Energy System performance metrics, comprising:
one or more Energy Systems;
sensors coupled to said Energy Systems to monitor said Energy Systems settings and performance attributes data;
sensors associated with said Energy Systems to measure environmental conditions data;
a network;
a local communications device coupled to said sensors and to said network and functional to communicate said Energy Systems settings and performance attributes data and said environmental conditions data onto said network;
said network functional to transmit said Energy Systems settings and performance attributes data and said environmental conditions data;
a centralized database coupled to said network and functional to receive and store said Energy Systems settings and performance attributes data and said environmental conditions data;
a user interface coupled to interact with said centralized database;
a computer readable medium containing procedures for acting upon said Energy Systems settings and performance attributes data and said environmental conditions data, said procedures comprising
aggregating the received and stored data with data from one or more systems not associated with said Energy Systems,
establishing benchmark metrics for Energy System performance based on the aggregated data,
establishing Energy System performance metrics, and comparing said Energy System performance metrics to said benchmark metrics; and
at least one output devices functional to display results of said procedure action upon said Energy Systems settings and performance attributes data and said environmental conditions data.

18. The system of claim 17 wherein said one or more Energy Systems comprise at least one of an energy usage system, an energy storage system, an energy management system, and an energy generation system.

19. The system of claim 18 wherein said energy generation system comprises a renewable energy generation system.

20. The system of claim 19 wherein said renewable energy generation system comprises a solar energy generation system, a wind turbine energy generation system, a tidal energy generation system, a geothermal energy generation system, a waste-to-energy generation system, or combinations thereof.

* * * * *